United States Patent [19]

Komura et al.

[11] Patent Number: 4,890,392
[45] Date of Patent: Jan. 2, 1990

[54] DIGITAL TAPE MEASURE

[75] Inventors: Manabu Komura, Uji; Kunio Hirai; Tatsuaki Nakai, both of Kyoto; Kazuyoshi Okumura, Joyo; Nobuyuki Yamamoto, Kyoto, all of Japan

[73] Assignee: Kyoto Measuring Instruments Corp., Kyoto, Japan

[21] Appl. No.: 37,106

[22] Filed: Apr. 10, 1987

Related U.S. Application Data

[63] Continuation of Ser. No. 763,815, Aug. 8, 1985, abandoned.

[30] Foreign Application Priority Data

Jan. 8, 1985 [JP] Japan .................. 60-001667

[51] Int. Cl.$^4$ ................................. G01B 3/10
[52] U.S. Cl. ........................................ 33/762; 377/18
[58] Field of Search ............. 33/138, 139, 140, 125 A, 33/1 N; 377/18; 250/231 R, 237 G; 340/636; 364/561–563

[56] References Cited

U.S. PATENT DOCUMENTS

| | | | |
|---|---|---|---|
| 3,718,807 | 2/1973 | Bracken et al. | 377/18 |
| 4,161,781 | 7/1979 | Hildebrandt et al. | 33/140 |
| 4,164,816 | 8/1979 | Bergkvist | 33/139 |
| 4,242,574 | 12/1980 | Grant | 33/140 |
| 4,395,630 | 7/1983 | Ramsden et al. | 33/140 |
| 4,438,431 | 3/1984 | Toyomura | 340/636 |

FOREIGN PATENT DOCUMENTS

| | | | |
|---|---|---|---|
| 2846915 | 5/1980 | Fed. Rep. of Germany | 33/139 |
| 49-33754 | 3/1974 | Japan . | |
| 113901 | 9/1980 | Japan | 33/138 |
| 0099701 | 6/1983 | Japan | 33/139 |
| 2056660 | 3/1981 | United Kingdom . | |
| 2100422 | 5/1981 | United Kingdom . | |
| 2009397 | 6/1981 | United Kingdom . | |

*Primary Examiner*—Allan N. Shoap
*Assistant Examiner*—Patrick R. Scanlon
*Attorney, Agent, or Firm*—Brumbaugh, Graves, Donohue & Raymond

[57] ABSTRACT

A digital tape measure comprising a tape stored in a case when it is not used and drawn out of an aperture of the case when it is used and onto which a plurality of detection marks are affixed at equivalent interval, a detector of detecting the detection marks by photoelectric transfer elements, a counter of counting the detected signal being output from the detector corresponding to the volume of movement of the tape, a display of displaying the result counted by the counter, and in which a length of each detection mark is established to be a length twice as long as the minimum scale of the tape, the distance between each detection mark is established to be equivalent to the length of each detection mark in the direction of measurement, and the detector comprises two photoelectric transfer elements arranged at the phase difference of 90° and a discriminator of discriminating the output signal from the photoelectric transfer elements.

2 Claims, 3 Drawing Sheets

FIG.3
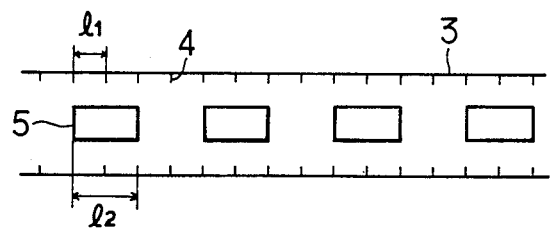
FIG.4
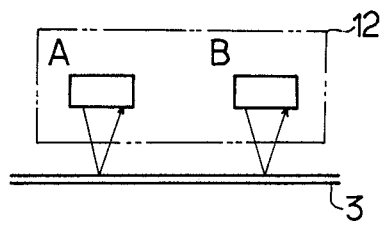
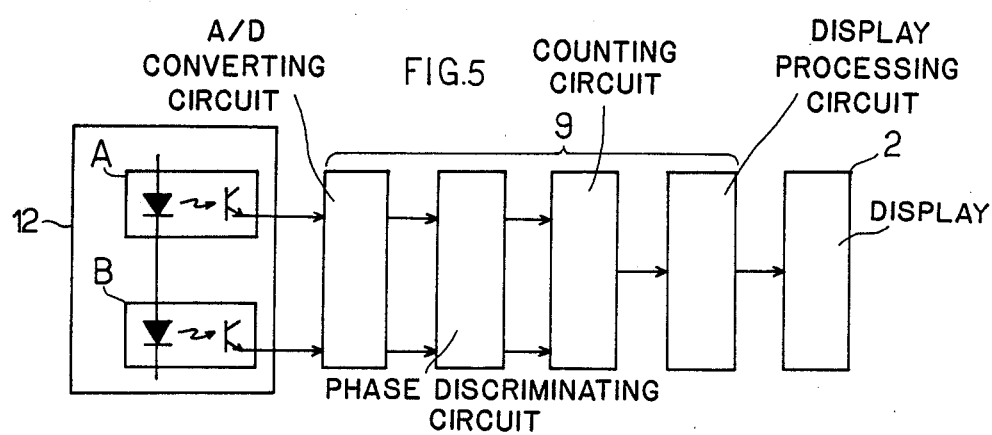
FIG.5
FIG.6(A)
FIG.6(B)
FIG.6(C)

1

DIGITAL TAPE MEASURE

This application is a continuation of application Ser. No. 763,815 filed on Aug. 8, 1985, and now abandoned.

BACKGROUND OF THE INVENTION (1) Field of the invention:

The present invention relates to a digital tape measure in which a tape is stored in a case and is movable being drawn out of the aperture of the case, and the detected volume of movement of the tape is converted to an electric signal so that the measured length may be digitally displayed being converted to an optional system of units.

(2) Prior art:

In a known digital tape measure wherein the detected volume of movement of the tape is converted to the electric signal by using a photoelectric transfer element, a light transmitting slit is provided on the tape, the tape is inserted between light emitting elements and light receiving elements, and the volume of movement is converted to the electric signal by reading the brightness, thereby the measurement of length being performed as is disclosed in Japanese laid open Patent Publication (unexamined) No. 49-33754.

In another known digital tape measure, a light is projected on a mark designated on the tape in place of providing a light transmitting slit thereon, and the detected signal corresponding to the volume of movement of the tape is counted by receiving the reflected light, thereby the measurement of length being performed. Furthermore, there has been proposed such digital tape measure as detecting a variation in the quantity of light by moire fringe for the purpose of securing high measuring accuracy as is disclosed in Japanese laid open Patent Publication No. 53-83653. Among the foregoing known digital tape measures, the first one in which a light transmitting slit is provided on the tape has a disadvantage that the straight extensibility and the strength against bending (bending resistance) both indispensable to the tape itself are unavoidably lowered, which is not preferable in view of the practical use. In case of said second one in which the measuring is performed using the reflected light from the tape on which a light is projected, although the accuracy in reading the mark is improved by stopping the focus of emitting light and receiving light, a lens system is necessary for stopping the focus resulting in the increase in cost. Moreover, since such focus stopping is performed, a miscount is possibly caused by small dust or stain on the tape negatively affecting the reliability of the measured result.

In case of the third one in which a variation in the quantity of light is detected using moire fringe, a mask is necessary, and considering that with respect to some object to be measured by means of an ordinary digital tape measure, such method of reading as using moire fringe is not always necessary, an increase in cost thereof is unavoidable in the same manner as the aforementioned second tape measure.

SUMMARY OF THE INVENTION

It is therefore an object of the present invention to overcome the above-discussed disadvantages of the known digital tape measures in which measuring operation is performed using the photoelectric transfer element. In other words, the present invention contemplates providing a digital tape measure having a sufficient accuracy in the measurement at rather low manufacturing cost without lowering the strength of the tape nor using specifically designed photoelectric transfer element and further without forming a lens system nor using any mask.

The foregoing object is accomplished by providing a digital tape measure comprising a tape stored in a case when it is not used and drawn out of an aperture of the case for extending movement when it is used and onto which a plurality of detection marks each having equivalent length in the direction of measuring length are affixed at equivalent interval, means of detecting said detection marks affixed onto the tape by means of photoelectric transfer elements, means of counting the detected signal being output from said detecting means corresponding to the volume of movement of the tape, and means of displaying the result counted by said counting means, characterized by that a length of each detection mark affixed onto said tape in the extending direction thereof is established to be a length twice as long as the minimum scale of the tape, that the distance between each detection mark is established to be equivalent to the length of each detection mark in the direction of measurement, and that said detecting means comprises two photoelectric transfer elements arranged at the phase difference of 90° and means of discriminating the output signal from said photoelectric transfer elements.

According to the digital tape measure of the present invention, since the length of the detection marks affixed onto the tape in the direction of measurement is so established as to be twice as long as the minimum scale of the tape, the detection of the detection marks can be accurately performed without having means for particularly intensifying the detecting sensibility of the photoelectric transfer means, and there is less possibility of miscounting caused by small dust or the like. Furthermore, since the discriminating output signal corresponding to a half of the length of the mark is obtained in the display by discriminating the signal having 90° of phase difference output from two photoelectric transfer elements arranged at 90° of phase difference, a measured result corresponding to the minimum unit of indication can be successfully displayed.

In consequence, since the digital tape measure of the present invention has the foregoing construction and performs the foregoing function, the following advantages are achieved:

(1) It becomes possible to provide easily at reasonable cost a digital tape measure by which an accurate measurement is performed being sufficiently prevented from miscount and the minimum display unit is set appropriately corresponding to the detected sensibility by using photoelectric transfer elements having ordinary sensibility without such particular means as lens system for stopping the focus of the emitting light and/or receiving light to and from the photoelectric transfer element, a mask for producing moire fringe, etc.

(2) In comparison with the known digital tape measure in which a light emitting slit is provided, the scale and the detection marks of the digital tape measure in accordance with the present invention are easily integrated onto the tape conventionally used, thereby the same strength as before being assured and resulting in higher reliability thereof.

BRIEF DESCRIPTION OF THE DRAWINGS

Other objects, features and advantages of the present invention will be seen in connection with the accompanying drawings in which:

FIG. 3 is a diagram for the explanation of one mode of the detection marks affixed onto the tape;

FIG. 4 is a diagram for the explanation of the construction of the sensor comprising photoelectric transfer elements;

FIG. 5 is a block diagram showing the construction of the processor for processing signals from the sensor;

FIG. 6 (A),(B) show signal waveforms from the photoelectric transfer elements being output at the phase difference of 90°, while (C) shows waveform of the phase discriminating output signal;

DESCRIPTION OF THE PREFERRED EMBODIMENT

Figure 1:
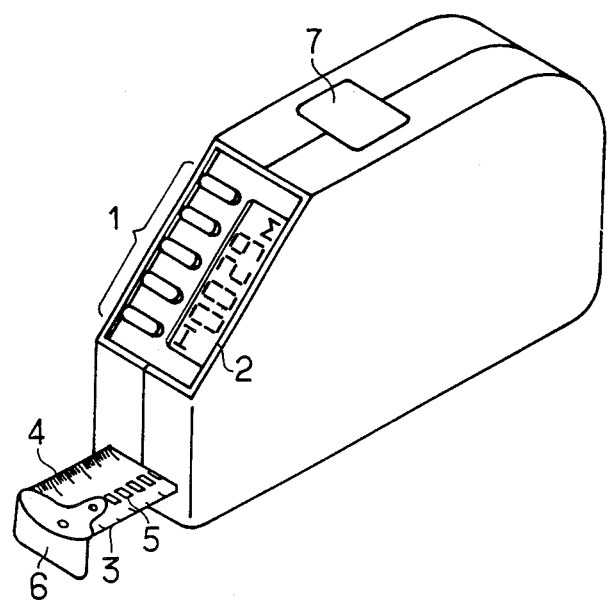
FIG. 1 is a perspective view showing an appearance of a digital tape measure embodying the present invention.
Figure 2:
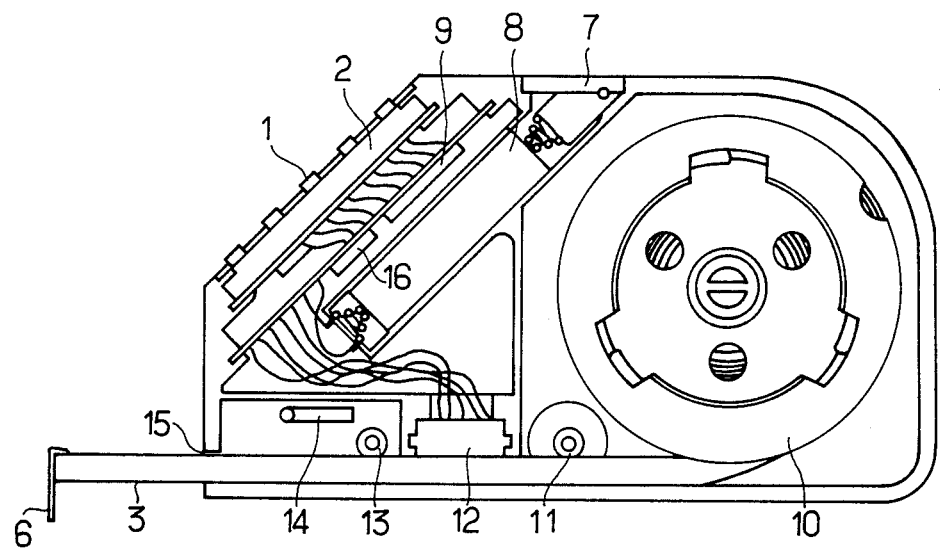
FIG. 2 is a side view showing the internal construction thereof taking a view uncovering one of the side cases of a case body.

Referring now to FIG. 1 showing the appearance of a digital tape measure embodying the present invention and to FIG. 2 showing the internal construction thereof taking a view uncovering one of the side cases of the case body, a tape (3) is included in a reel (10) inside the case body being wound thereon and is drawn out of a drawing aperture (15) by way of presser rollers (11), (13). An end hook (6) is mounted on a top end of the tape (3) so as to be applied to an object to be measured. An inner end of the tape (3) is connected with a spiral spring (not illustrated) so as to be automatically rewound the tape and is fixed at any position by the actuation of a tape lock (14). The measurement of length based on the quantity of movement of the tape (3), i.e., establishing the position of the drawing aperture (15) to be a base line is performed by photoelectrically detecting a black mark (5) which is a light absorbing portion affixed onto the tape as shown in FIG. 3 by means of a sensor (12) comprising photoelectric transfer elements.

The width ($1_1$) of the mark (5) affixed onto the tape (3) shown in FIG. 3 is twice as long as the scale so as to be $1_2 = 2\, 1_1$ in relation to the minimum-scale width of the tape (3). Usually white or yellow color is painted on the tape (3). White color may be preferred considering the reflecting effect by the light projected from the sensor (12), but yellow color is also sufficient against the black mark (5) in practical use, and it may be said that the yellow scale (4) of the tape (5) is easy to see in view of the decorative effect. The width of each detection mark (5) is so established as to be 2 mm when the minimum scale (4) of the tape is 1 mm and be 1 mm when the minimum scale is 0.5 mm. The width of white or yellow ground color of the tape (3) between each detection mark (5) is established in the quite same manner the mark (5). These scale (4) and the detection mark (5) are integrally printed.

Two sensors (12) for detecting said detection mark (5) are arranged having a phase difference of 90° at the position of phase A and phase B respectively as shown in FIG. 4, and each sensor comprising a small reflection type sensor in combination of an infrared light emitting diode generally used in the detection of cassette tape end or the like with a phototransistor.

The sensor (12) detects at least one detection mark (5) corresponding to the moved distance of the tape, and the detected signal is processed in the detection signal processor (9), and the processed result, i.e., the measured length of the object is displayed in the display (2). The composition of the processor (9) is as shown in FIG. 5. The detected signals of phase A and phase B are respectively input to A/D converting circuit and are output as digital signals (A), (B) having phase difference of 90° as shown in FIG. 6. Said signals having phase difference of 90° are then input to a phase discriminating circuit and are output as a phase discriminating signal (C) as shown in FIG. 6. The phase discriminating signal is counted by a counting circuit, and is displayed on the display (2) as a measured length by way of display processing circuit.

By processing the phase discriminating output signal as above-described, in the reading step of the detection marks (5) the length of which is twice as long as the minimum unit to be displayed in the display (2), i.e., the minimum scale of the tape is detected and accordingly it becomes unnecessary to employ a particular sensor of high accuracy, while in the display step the measured length can be displayed at the minimum scale of one half of the detection mark. Since it is not necessary to use a highly accurate sensor and an object to be detected becomes relatively large, such miscount as detecting small dust or the like sticked to the tape can be sufficiently prevented.

Figure 7:
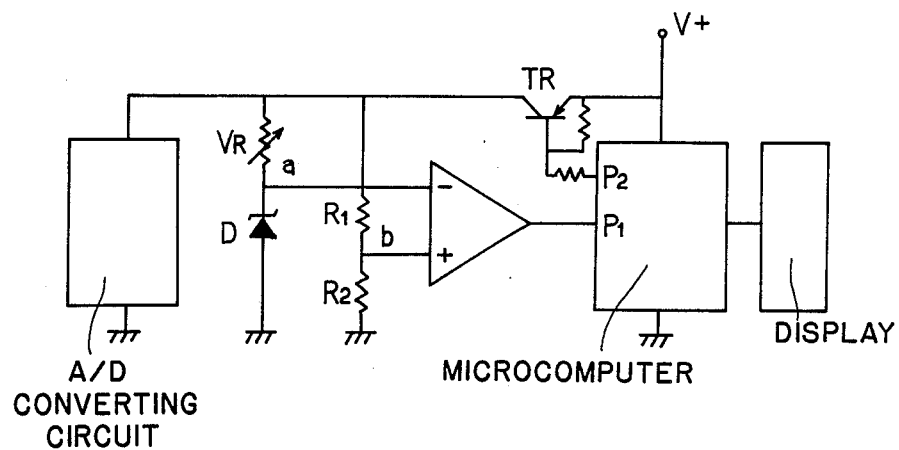
FIG. 7 is a circuit diagram showing one mode of formation of an alarm control circuit.

In FIG. 2 a battery (8) which is a power source of the tape measure is inserted in the back side space parallel with an inclined portion of the case body in which the display (2) and the signal processor (9) are disposed after uncovering a cover (7) so as to be compact as a whole. When the voltage of the battery (8) is lowered, an alarm controller (16) starts its function thereby being prevented from misoperation. In other words, referring to FIG. 7, the current running into a Zener diode (D) is adjusted by means of a variable resistor (VR) and a reference voltage at point A is initialized (1.5 V for example). In voltage dividing circuits ($R_1$), ($R_2$) for voltage detection, when the source voltage is high, i.e., when the battery is relatively new, the point B is 1.7 V for example and the output of a comparator is (H) which is read by a port ($P_1$) of a microcomputer. When the source, voltage is lowered and the voltage at the point B is less than 1.5 V, the port ($P_1$) is (L) while the port ($P_2$) being (H) by program, and the transistor (TR) is turned to OFF. That is, the power supply to the A/D converting circuit is interrupted and at the same time the voltage lowering is displayed on the display directed by the micro-computer.

In this connection, referring to FIG. 1, operation keys (1) and the display (2) are disposed on the inclined portion formed between the upper side of the case body and the front side of the tape drawing aperture (15).

In the conventional measures, the display is disposed on the side part of the case body having angular difference by 90° from the scale side of the tape, and therefore it is difficult to carry out reading of display, operation of key, etc. In other words, as it is necessary to twist or change the position of the side of the case body so as to face the operator, particularly in case of automatic winding tape, the end hook gets out of the object to be measured and the tape comes to be unnecessarily stored in the case body. Further, when visually confirming the display from an inclined position like a squint, particularly in case of using LCD, the display is not read completely because of the limitation in such visual angle. Considering the foregoing points the operating key (1) and the display (2) are disposed on the inclined face in this embodiment. Consequently, since the scale (4) of the tape (3) and the display (2) are in the same visual direction, the reading step during the measurement is quite easy and the tape (3) can be applied exactly to the object to be measured by means of the hook (6). Further, since the display (2) is located near the scale (4) of the tape (3), it becomes also easy to confirm the digital display value and the tape scale value comparing each other, and besides the display face is not hidden from sight when the body is grasped by fingers and the operation of the keys being easy.

Figure 8:
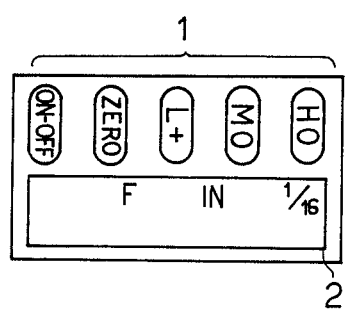
FIG. 8 is an enlarged plan view showing one mode of a group of keys and the display.

An example of composition of a group of keys (1) and the display (2) are shown in FIG. 8, and it is also possible to achieve a general purpose use with ease by varieties of key operations based on the control of the microcomputer. Referring to FIG. 8, the key (HO) means a hold key to be used when the measured result is held. The key (MO) means a mode key by which the system of unit for measurement is changed from centimeter to inch and vice versa. FIG. 8 illustratively shows that the unit is changed to inch system so as to display F, IN and 1/16. The key (L+) is used when measuring the inside of a window frame or the like, and the display is performed by adding the length of the case body. The key (ZERO) is a key for instructing the measurement of relative volume of movement establishing the drawn position of the tape (3) to be zero when it is drawn out up to any length. The key (ON-OFF) performs ON-OFF operation of the power source.

What is claimed is:

1. A digital tape measure comprising:
   a case having an aperture therethrough and an elongated tape supported within said case in coiled condition so as to be withdrawable therefrom through said aperture with a free end adapted to be moved toward and away from said case to traverse a distance to be measured;
   a series of detection marks of equal length spaced by equal intervals along the length of said tape, said marks being twice as long as a minimum unit length which can be digitally displayed and said intervals between marks having a length equal to that of said marks;
   means for detecting said detection marks and outputting a detection signal including photoelectric sensing means supported in said case over and in close proximity to the surface of the tape on which said marks are carried and operatively associated with said detection marks on said tape for providing output signals at constant increments of distance during movement of said tape relative to said case indicating transitions between said marks and the intervals therebetween, said photoelectric sensing means comprising a pair of reflective-type photoelectric transfer elements spaced along the direction of movement of said tape at a phase difference of 90° for producing in response to a given detection mark respective output signals differing in phase by 90°, each said transfer element comprising a light-emitting element positioned to directly and unobstructedly irradiate said tape in combination with a light-receiving element positioned adjacent said light-emitting element in a common structure to directly and unobstructedly receive light reflected from said tape when said marks are irradiated by said light-emitting element, said means for detecting further including a battery providing a voltage for operating said detecting means;
   readout means operatively connected to said transfer elements for converting said detection signal to an indication of the distance traversed by said tape and displaying said indication;
   means operatively connected to said batteries for indicating its voltage when it is below a specified value; and
   alarm circuit means operatively connected to said battery for stopping detection by said means for detecting when said voltage is below said specified value.

2. A digital tape measure as defined in claim 1, wherein said case has an upper side, said readout means being disposed above said aperture of said case and on an inclined portion of said case formed in relation to the upper side of said case.

* * * * *